(12) United States Patent
Utsumi

(10) Patent No.: US 6,493,833 B1
(45) Date of Patent: Dec. 10, 2002

(54) MICROCOMPUTER

(75) Inventor: Takashi Utsumi, Tokyo (JP)

(73) Assignee: Mitsubishi Denki Kabushiki Kaisha, Chiyoda-Ku (JP)

( * ) Notice: Subject to any disclaimer, the term of this patent is extended or adjusted under 35 U.S.C. 154(b) by 0 days.

(21) Appl. No.: 09/440,056

(22) Filed: Nov. 15, 1999

(30) Foreign Application Priority Data

May 13, 1999 (JP) ............................................. 11-132685

(51) Int. Cl.$^7$ ................................................ G06F 11/27
(52) U.S. Cl. ............................... 714/30; 714/36; 703/28
(58) Field of Search ............................. 714/27–30, 36, 714/39; 713/1–2; 703/28

(56) References Cited

U.S. PATENT DOCUMENTS

| | | | |
|---|---|---|---|
| 5,463,766 A | * | 10/1995 | Schieve et al. .............. 711/103 |
| 6,075,941 A | * | 6/2000 | Itoh et al. ...................... 714/38 |
| 6,079,016 A | * | 6/2000 | Park ............................. 710/10 |
| 6,154,837 A | * | 11/2000 | Fudeyasu et al. .............. 713/2 |

FOREIGN PATENT DOCUMENTS

JP         1-201762        8/1989

* cited by examiner

Primary Examiner—Scott Baderman
Assistant Examiner—John Lohn
(74) Attorney, Agent, or Firm—Burns, Doane, Swecker & Mathis, LLP

(57) ABSTRACT

A microcomputer including a built-in storage portion capable of executing an evaluation program by an ICE through a simple operation also when the evaluation program cannot be written in the built-in ROM is obtained. A debugging circuit (2) outputs a reset vector selection signal (S2) indicating generation of a reset vector (V1/V2) in response to a control signal (S1) indicating a normal mode/a RAM starting mode, and a reset circuit (3) generates a reset vector (V1/V2) indicating a starting address (A1/A2) after reset cancellation by indication of the reset vector selection signal (S2). The microcomputer can be set to execute the evaluation program from the starting address (A2) on a RAM area (5) after reset cancellation by registering the evaluation program (start address=starting address (A2)) in the RAM area (5) from the ICE through the debugging circuit (2) and thereafter supplying a control signal (S1) indicating the RAM starting mode to the debugging circuit (2).

12 Claims, 4 Drawing Sheets

MICROCOMPUTER

BACKGROUND OF THE INVENTION

1. Field of the Invention

The present invention relates to a microcomputer including a built-in debugging circuit.

2. Description of the Background Art

FIG. 7 is an explanatory diagram showing memory arrangement of a conventional microcomputer including a built-in ROM. As shown in FIG. 7, a memory area is formed by a RAM area 5 and a built-in ROM area 6, and a starting address A1 is allocated onto the built-in ROM area 6. The built-in ROM may be formed by a flash memory or a mask ROM. The starting address A1 is a start address for a program to be executed in reset cancellation after reset cancellation.

A reset circuit 53 generates a reset vector V1 indicating the starting address A1 after reset cancellation.

In the conventional microcomputer including a built-in ROM having the aforementioned structure, the reset circuit 53 generates the reset vector V1 after reset cancellation, so that the program to be executed in reset cancellation is executed from the starting address A1 on the built-in ROM area 6.

Consider the case of evaluating a system including the conventional microcomputer including a built-in ROM having the aforementioned structure with an ICE (in-circuit emulator).

When the built-in ROM is a flash memory, an evaluation program (start address=starting address A1) is registered in the built-in ROM area 6 of the flash memory from the ICE through the reset circuit 53 so that the evaluation program is executed from the starting address A1 on the built-in ROM area 6 after reset cancellation.

If the flash memory accepts no writing for some reason, however, the following operations must be performed under control of the ICE.

After registering the evaluation program in the RAM area 5 of the microcomputer through the debugging circuit 53, it is necessary to perform debugging interrupt processing by setting the microcomputer in a normal mode and making the microcomputer execute processing from the start address for the evaluation program on the built-in RAM under control of the ICE. Thus, the series of operations by the ICE for forcibly executing the evaluation program under control of the ICE are extremely complicated.

Also when the built-in ROM is a mask ROM accepting no writing, the aforementioned series of operations by the ICE are necessary similarly to the case of the flash memory.

SUMMARY OF THE INVENTION

According to a first aspect of the present invention, a microcomputer including a built-in storage portion capable of registering an evaluation program from an external evaluation unit comprises a CPU; a debugging circuit performing a support operation for registration of the evaluation program from the external evaluation unit in the storage portion and support operation in execution of the evaluation program, and the debugging circuit is capable of generating a reset vector selection signal indicating an address for executing the evaluation program under control of the external evaluation unit; and a reset circuit generating a reset vector in reset cancellation after execution of a reset operation and making the CPU execute a program to be executed in reset cancellation registered on the storage portion on the basis of the reset vector. The reset circuit decides the reset vector on the basis of the reset vector selection signal.

According to the first aspect, the debugging circuit can generate the reset vector selection signal indicating the address for executing the evaluation program, and the reset circuit decides the reset vector on the basis of the reset vector selection signal.

When registering the evaluation program in the storage portion from the external evaluation unit, therefore, it is possible to make the CPU automatically execute the evaluation program as the program to be executed in reset cancellation by generating the reset vector selection signal indicating the address for executing the evaluation program and thereafter resetting the microcomputer, whereby the evaluation program by the external evaluation unit can be executed through a simple operation also when the evaluation program can be written only in a limited area of the built-in storage portion.

According to a second aspect of the present invention, the external evaluation unit includes an ICE (in-circuit emulator).

According to a third aspect of the present invention, the address for executing the evaluation program includes a start address for the evaluation program, and the reset circuit generates the reset vector indicating starting from the start address to make the CPU execute the evaluation program as the program to be executed in reset cancellation when the reset vector selection signal indicates the start address for the evaluation program.

According to the third aspect, the reset circuit generates the reset vector indicating starting from the start address and makes the CPU execute the evaluation program as the program to be executed in reset cancellation when the reset vector selection signal indicates the start address for the evaluation program, whereby the evaluation program starting from the start address is automatically executed in reset cancellation after registration of the evaluation program.

According to a fourth aspect of the present invention, the storage portion consists of first and second storage areas having different electric characteristics, the evaluation program is registered in the first storage area, and the reset circuit generates a reset vector indicating starting from an address on the second storage area when the reset vector selection signal does not indicate the start address for the evaluation program.

According to a fifth aspect of the present invention, the first storage area includes a RAM area, and the second storage area includes a ROM area.

According to a sixth aspect of the present invention, the ROM area includes a rewritable flash memory area.

According to a seventh aspect of the present invention, the storage portion includes an interrupt register capable of storing an interrupt address, the address for executing the evaluation program includes an address of the interrupt register, the debugging circuit is capable of storing the start address for the evaluation program in the interrupt register as the interrupt address under control of the external evaluation unit, and the reset circuit generates a reset vector indicating interrupt processing starting from the interrupt address to make the CPU execute the evaluation program as the program to be executed in reset cancellation when the reset vector selection signal indicates an address of the interrupt register.

According to the seventh aspect, the reset circuit generates the reset vector indicating interrupt processing starting from the interrupt address to make the CPU execute the evaluation program as the program to be executed in reset cancellation when the reset vector selection signal indicates the address of the interrupt register, whereby interrupt processing starting from the start address for the evaluation program is automatically executed in reset cancellation after registration of the evaluation program.

According to an eighth aspect of the present invention, the reset vector selection signal includes a reset address selection signal capable of specifying all addresses on the storage portion.

According to the eighth aspect, the reset vector selection signal includes the reset address selection signal capable of indicating all addresses on the storage portion, whereby the evaluation program can be registered in an arbitrary area on the registerable storage portion.

According to a ninth aspect of the present invention, the reset address selection signal is propagated to the reset circuit through a plurality of signal lines, and the plurality of signal lines are capable of propagating multilevel information allowing recognition of at least three levels, and the reset circuit includes a multilevel determination circuit capable of determining multilevel information of each of the plurality of signal lines.

According to the ninth aspect of the present invention, each of the plurality of signal lines propagating the reset address selection signal of the microcomputer can propagate multilevel information allowing recognition of at least three levels, whereby the total number the plurality of signal lines can be reduced as compared with the case of transmitting binary information.

According to a tenth aspect of the present invention, at least three types of multilevel voltages are set in each of the plurality of signal lines thereby propagating the reset address selection signal, and the multilevel determination circuit includes a voltage conversion circuit converting the voltages of each of the plurality of signal lines and recognizing the multilevel information.

According to an eleventh aspect of the present invention, the microcomputer further comprises a fail safe circuit interposed between the debugging circuit and the reset circuit for validating indication of the address for executing the evaluation program by the reset vector selection signal only when the reset vector selection signal satisfies a prescribed condition and indicates the start address for the evaluation program.

According to the eleventh aspect, the fail safe circuit validates indication of the address for executing the evaluation program by the reset vector selection signal only when the reset vector selection signal satisfies the prescribed condition and indicates the start address for the evaluation program, whereby such an inconvenience that the reset vector selection signal falsely indicates the start address for the evaluation program can be reliably avoided.

According to a twelfth aspect of the present invention, the prescribed condition includes such a time restraint that the reset vector selection signal continuously indicates the address for executing the evaluation program at least for a prescribed period.

An object of the present invention is to obtain a microcomputer including a built-in storage portion, which can execute an evaluation program by an external evaluation unit such as an ICE through a simple operation also when the evaluation program can be written only in a limited area of the built-in storage portion.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

<Embodiment 1>

Figure 1:
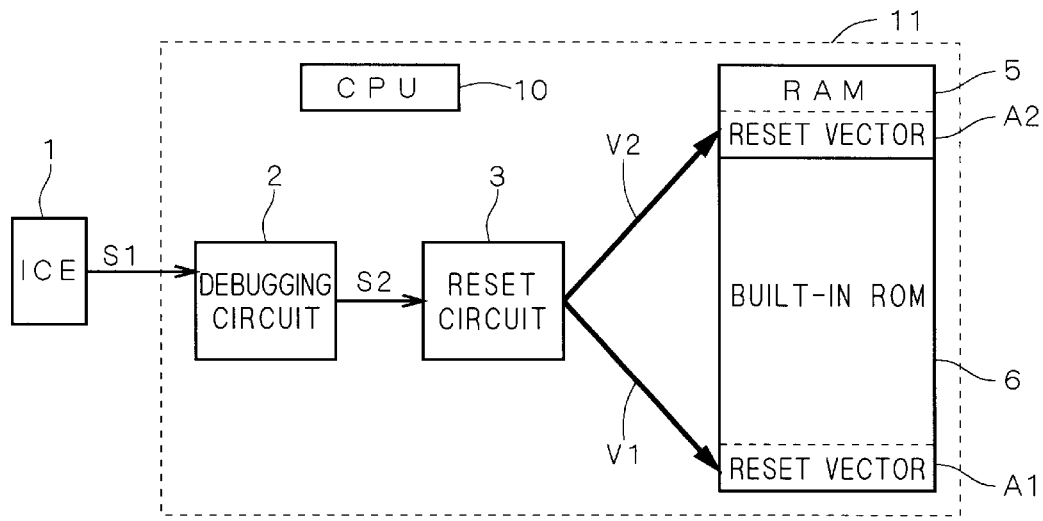
FIG. 1 is an explanatory diagram showing a microcomputer according to an embodiment 1 of the present invention.

FIG. 1 is an explanatory diagram showing the structure of a microcomputer 11 according to an embodiment 1 of the present invention. As shown in FIG. 1, a debugging circuit 2 in the microcomputer 11 is connected with an ICE 1, and receives a control signal S1 from the ICE 1.

The debugging circuit 2 outputs a reset vector selection signal S2 indicating generation of a reset vector V1/V2 in response to the control signal S1 indicating a normal mode/a RAM starting mode to a reset circuit 3. The debugging circuit 2 also performs processing of supporting an operation registering an evaluation program from the ICE 1 and debug processing of detecting the internal state of the microcomputer 11 in execution of emulation under control of the ICE 1 for supporting execution of emulation.

The reset circuit 3 generates the reset vector V1 indicating a starting address A1 or the reset vector V2 indicating a starting address A2 by indication of the reset vector selection signal S2 after reset cancellation upon execution of a reset operation.

The memory in the microcomputer 11 is formed by a RAM area 5 and a builtin ROM area 6, and the starting address A1 is allocated to the built-in ROM area 6 while the starting address A2 is allocated to the RAM area 5. The built-in ROM may be formed by a flash memory or a mask ROM.

A CPU 10 executes a program to be executed in reset cancellation registered in the RAM area 5 or the built-in ROM area 6 in reset cancellation on the basis of the reset vector V1 or V2 from the reset circuit 3.

Consider the case of evaluating a system including the microcomputer 11 according to the embodiment 1 having the aforementioned structure with the ICE 1.

When the microcomputer 11 is in a normal state and the ROM built therein is a flash memory, an evaluation program (program start address=starting address A1) is registered in the built-in ROM area 6 of the flash memory from the ICE 1 through the debugging circuit 2 and thereafter the control signal S1 indicating the normal mode is supplied to the debugging circuit 2 so that the evaluation program is executed from the starting address A1 on the built-in ROM area 6 after reset cancellation.

In an abnormal state where the flash memory accepts no writing for some reason, the evaluation program (start address=starting address A2) is registered in the RAM area 5 from the ICE 1 through the debugging circuit 2 and thereafter the control signal S1 indicating the RAM starting mode to the debugging circuit 2 so that the evaluation program is executed from the starting address A2 on the RAM area 5 after reset cancellation.

If the built-in ROM is a mask ROM accepting no writing, the evaluation program can be executed from the starting address A2 on the RAM area 5 after reset cancellation through operations similar to those in the abnormal state where the flash memory accepts no writing.

Thus, the microcomputer 11 according to the embodiment 1 can execute the evaluation program from the ICE 1 in the normal state (ROM starting) and the abnormal state (RAM starting) through similar operations.

Consequently, the microcomputer 11 according to the embodiment 1 can attain such an effect that the evaluation program by the ICE 1 registered in the RAM area 5 can be executed through simple operations also when the evaluation program cannot be written in the built-in ROM.

<Embodiment 2>

Figure 2:
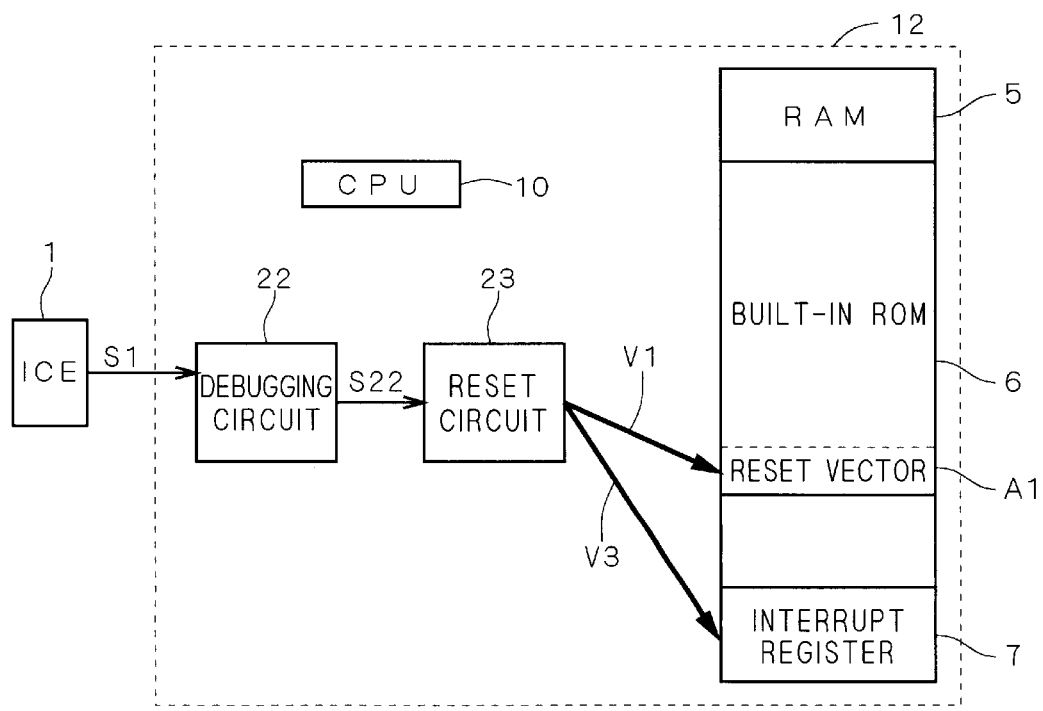
FIG. 2 is an explanatory diagram showing a microcomputer according to an embodiment 2 of the present invention.

FIG. 2 is an explanatory diagram showing the structure of a microcomputer 12 according to an embodiment 2 of the present invention. As shown in FIG. 2, a debugging circuit 22 in the microcomputer 12 is connected with an ICE 1, and receives a control signal S1 from the ICE 1.

The debugging circuit 22 outputs a reset vector selection signal S22 indicating generation of a reset vector V1/V3 to a reset circuit 23 in response to the control signal S1 indicating a normal mode/an interrupt starting mode. The debugging circuit 22 also performs evaluation program registration support processing and debug processing similarly to the debugging circuit 2 of the embodiment 1.

The reset circuit 23 generates the reset vector V1 indicating a starting address A1 or the reset vector V3 indicating an address of an interrupt register area 7 by indication of the reset vector selection signal S22 after reset cancellation.

The memory in the microcomputer 12 is formed by a RAM area 5, a built-in ROM area 6 and the interrupt register area 7, and the starting address A1 is allocated to the built-in ROM area 6. The built-in ROM may be formed by a flash memory or a mask ROM.

A CPU 10 executes a program to be executed in reset cancellation registered in the RAM area 5 or the built-in ROM area 6 or a program to be executed in reset cancellation by interrupt processing starting from an interrupt address stored in the interrupt register area 7 on the basis of the reset vector V1 or V3 from the reset circuit 23.

Consider the case of evaluating a system including the microcomputer 12 according to the embodiment 2 having the aforementioned structure with the ICE 1.

In a normal state, the microcomputer 12 performs operations similar to those of the microcomputer 11 according to the embodiment 1, so that an evaluation program is executed from the starting address A1 on the built-in ROM area 6 after reset cancellation.

In an abnormal state where only a part of the built-in ROM area 6 of the flash memory can serve as a writable area (excluding the starting address A1), on the other hand, the evaluation program is registered in the writable area of the built-in ROM area 6 from the ICE 1 through the debugging circuit 22 while a start address for the evaluation program is registered as the interrupt address of the interrupt register area 7 and thereafter the control signal S1 indicating the interrupt starting mode to the debugging circuit 22 for executing interrupt processing after reset cancellation, so that the execution program is executed from the interrupt address (start address for the evaluation program) stored in the interrupt register area 7. It is also possible to enable registration of the evaluation program in the RAM area 5 by the aforementioned method.

Thus, the microcomputer 12 according to the embodiment 2 can execute the evaluation program in the normal state and the abnormal state (interrupt starting) through similar operations, except the operation of registering the start address for the evaluation program in the interrupt register area 7.

Consequently, the microcomputer 12 according to the embodiment 2 attains such an effect that the evaluation program by the ICE 1 can be executed through simple operations also when the evaluation program can be written only in a part of the built-in ROM.

<Embodiment 3>

Figure 3:
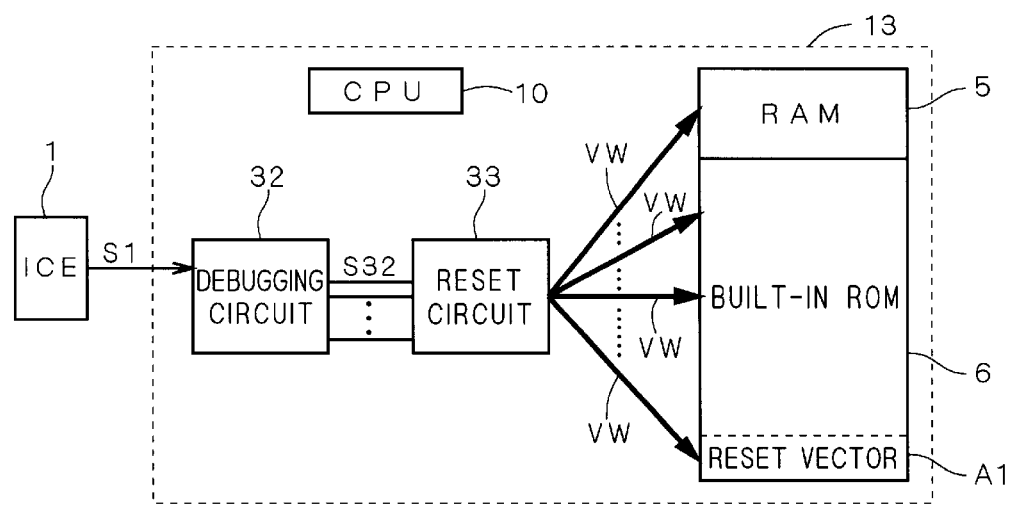
FIG. 3 is an explanatory diagram showing a microcomputer according to an embodiment 3 of the present invention.

FIG. 3 is an explanatory diagram showing the structure of a microcomputer 13 according to an embodiment 3 of the present invention. As shown in FIG. 3, a debugging circuit 32 in the microcomputer 13 is connected with an ICE 1, and receives a control signal S1 from the ICE 1.

The debugging circuit 32 outputs a reset address selection signal S32 specifying an address indicated by the control signal S1 on the basis of the control signal S1. The reset address selection signal S32 is formed by a plurality of bits capable of specifying arbitrary addresses among all addresses of a RAM area 5 and a built-in ROM area 6. The debugging circuit 32 also performs evaluation program registration support processing and debug processing similarly to the debugging circuit 2 in the embodiment 1.

The reset circuit 33 generates reset vectors VW indicating the addresses specified by the reset address selection signal S32 after reset cancellation.

The memory in the microcomputer 13 is formed by the RAM area 5 and the built-in ROM area 6, and a starting address A1 is allocated to the built-in ROM area 6. The built-in ROM may be formed by a flash memory or a mask ROM.

A CPU 10 executes a program to be executed in reset cancellation registered in the RAM area 5 or the built-in ROM area 6 on the basis of the reset vectors VW from the reset circuit 33 in reset cancellation.

Consider the case of evaluating a system including the microcomputer 13 according to the embodiment 3 having the aforementioned structure with the ICE 1.

In a normal state, an evaluation program is executed from the starting address A1 on the built-in ROM area 6 after reset cancellation through operations similar to those in the microcomputer 11 according to the embodiment 1.

In the case of writing the evaluation program in the RAM area 5 in a first abnormal state where the flash memory accepts no writing for some reason, the evaluation program is registered in the RAM area 5 from the ICE 1 through the debugging circuit 32 while the control signal S1 indicating a start address for the evaluation program is supplied to the debugging circuit 32 so that the evaluation program on the RAM area 5 is executed after reset cancellation.

In a second abnormal state where only a part of the built-in ROM area 6 of the flash memory can serve as a writable area (excluding the starting address A1), the evaluation program is registered in the writable area of the built-in ROM area 6 from the ICE 1 through the debugging circuit 32 while the control signal S1 indicating the start address for the evaluation program is supplied to the debugging circuit 32 so that the evaluation program is executed after reset cancellation.

Thus, the microcomputer 13 according to the embodiment 3 can execute the evaluation program in the normal state and the first and second abnormal states through similar operations.

Consequently, the microcomputer 13 according to the embodiment 3 attains such an effect that the evaluation program by the ICE 1 can be executed through simple operations also when the evaluation program cannot be entirely or partially written in the built-in ROM.

Further, an arbitrary address on the RAM area 5 or the built-in ROM area 6 can be set as a starting address in addition to the starting address A1, whereby the evaluation program can be registered in a registerable arbitrary area of the RAM area 5 of the builtin ROM area 6.

<Embodiment 4>

Figure 4:
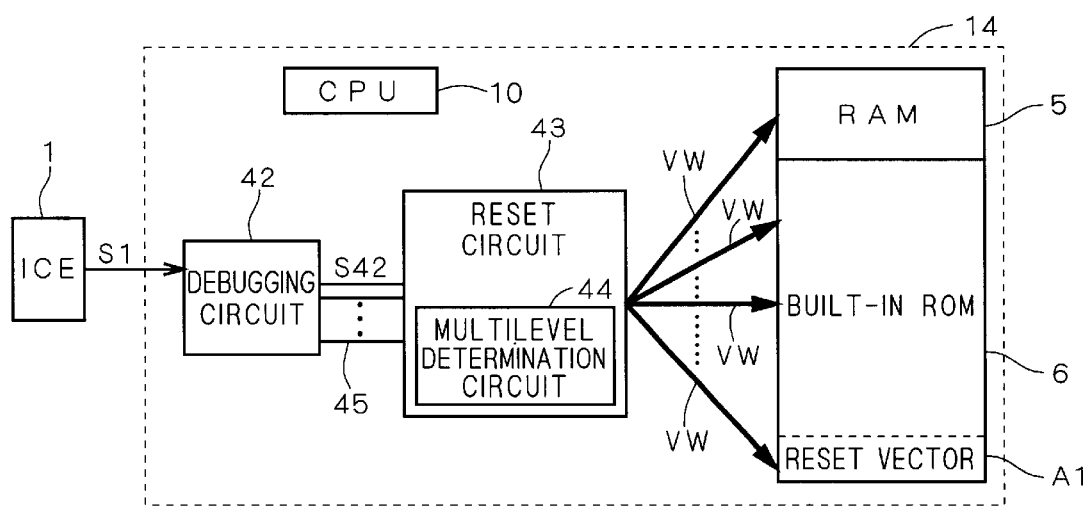
FIG. 4 is an explanatory diagram showing a microcomputer according to an embodiment 4 of the present invention.

FIG. 4 is an explanatory diagram showing the structure of a microcomputer 14 according to an embodiment 4 of the present invention. As shown in FIG. 4, a debugging circuit 42 outputs a reset address selection signal S42 specifying an address indicated by a control signal S1 to a reset circuit 43 on the basis of the control signal S1. The reset address selection signal S42, which is a signal of a plurality of bits capable of specifying arbitrary addresses among all addresses of a RAM area 5 and a built-in ROM area 6, is propagated to the reset circuit 43 through a plurality of signal lines 45. Multilevel voltages (multilevel information) of at least three levels are set in each of the plurality of signal lines 45.

The reset circuit 43 includes a built-in multilevel determination circuit 44, which has a voltage conversion function capable of converting the voltages of each of the plurality of signal lines 45 and recognizing the multilevel information. Therefore, the reset circuit 43 recognizes the addresses specified by the reset address selection signal S42 through the voltage conversion function of the multilevel determination circuit 44, and generates reset vectors VW indicating the aforementioned addresses after reset cancellation.

The remaining structure is similar to that of the microcomputer 13 according to the embodiment 3 shown in FIG. 3, and hence redundant description is omitted.

The microcomputer 14 according to the embodiment 4 having the aforementioned structure attains an effect similar to that of the microcomputer 13 according to the embodiment 3. In the microcomputer 14 according to the embodiment 4, further, each bit of the reset address selection signal S42 is supplied with multilevel information, whereby the number of the plurality of signal lines 45 for propagating the reset address selection signal S42 can be reduced as compared with the case of transmitting binary information by increasing the amount of information per signal line.

<Embodiment 5>

Figure 5:
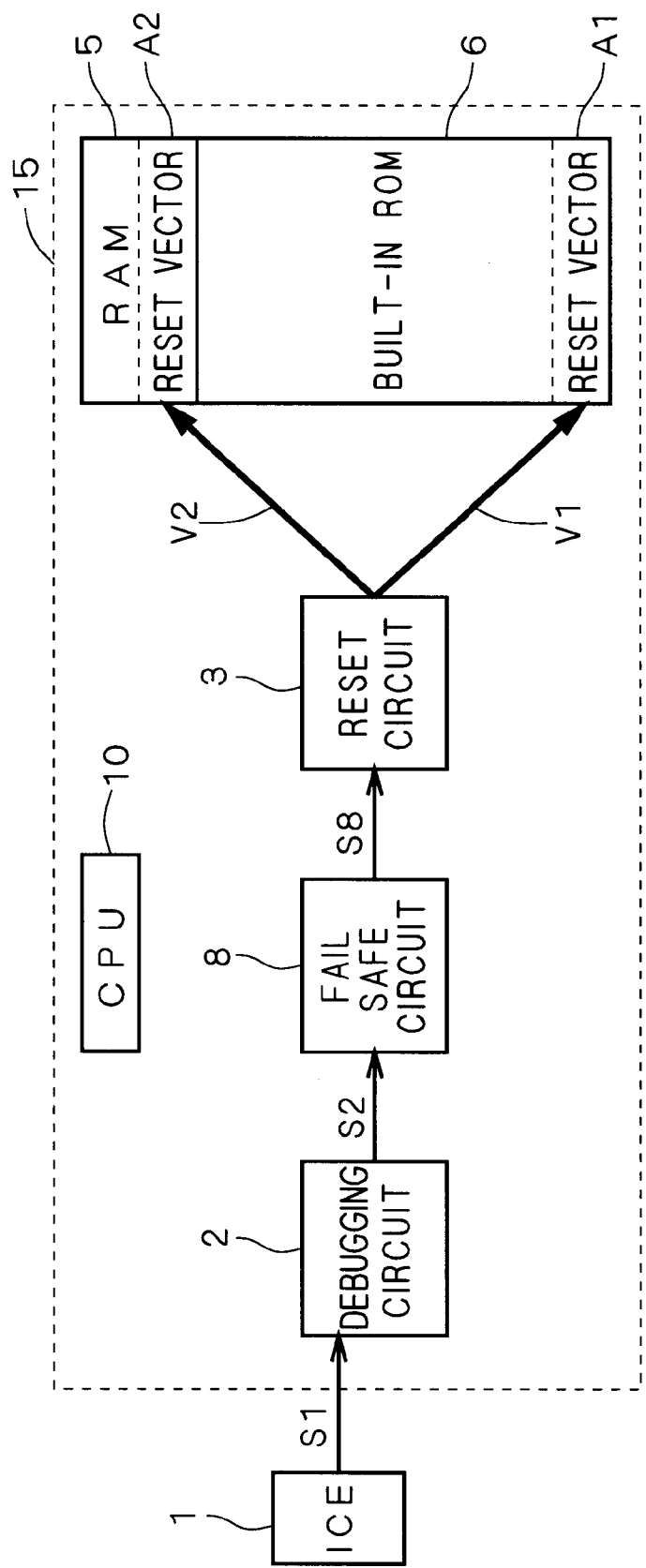
FIG. 5 is an explanatory diagram showing a microcomputer according to an embodiment 5 of the present invention.

FIG. 5 is an explanatory diagram showing the structure of a microcomputer 15 according to an embodiment 5 of the present invention. As shown in FIG. 5, a fail safe circuit 8 is provided between a debugging circuit 2 and a reset circuit 3. The fail safe circuit 8 outputs a checked reset vector selection signal S8 to the reset circuit 3 on the basis of a reset vector selection signal S2.

The reset circuit 3 generates a reset vector V1 indicating a starting address A1 or a reset vector V2 indicating a starting address A2 by indication of the checked reset vector selection signal S8 after reset cancellation. The remaining structure is similar to that of the embodiment 1 shown in FIG. 1, and hence redundant description is omitted.

Figure 6:
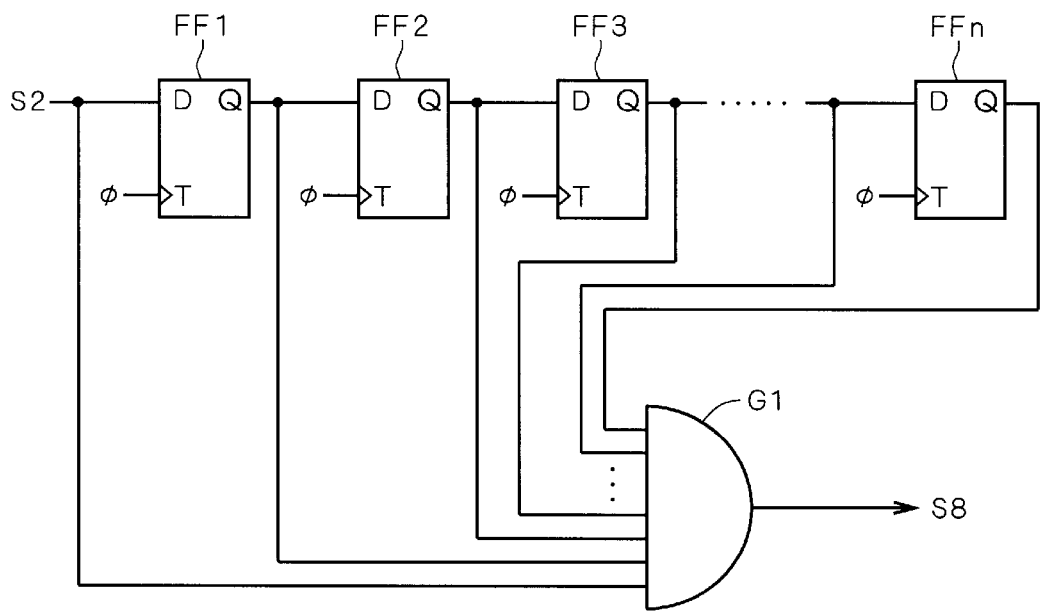
FIG. 6 is a circuit diagram showing the internal structure of a fail safe circuit shown in FIG. 5.
Figure 7:
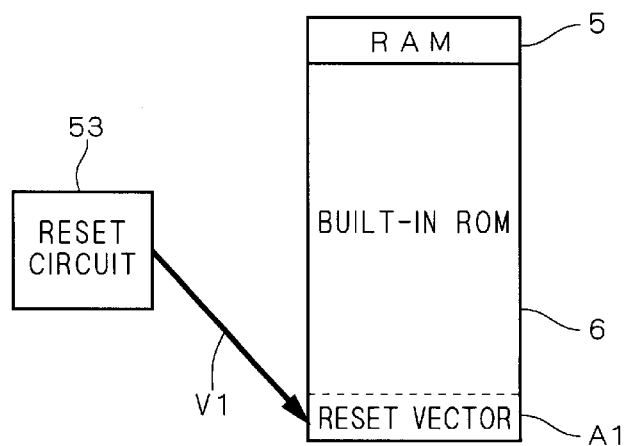
FIG. 7 is an explanatory diagram showing a conventional microcomputer.

FIG. 6 is a circuit diagram showing the internal structure of the fail safe circuit 8.

As shown in FIG. 6, n inputs D and n outputs Q of positive edge trigger D-flip-flops FF1 to FFn (n≧2) are serially connected. A clock φ oscillating in a cycle T is applied in common to toggle inputs T of the flip-flops FF1 to FFn, the reset vector selection signal S2 is received in the D input of the initial-stage flip-flop FF1 and the outputs Q of the flip-flops FF1 to FFn are supplied to an input of an AND gate G1, which in turn outputs the checked reset vector selection signal S8.

The checked vector selection signal S8 indicates the reset vector V1 (vector for a normal mode) when at a low level, and indicates the reset vector V2 (vector for a RAM starting mode) when at a high level.

In the fail safe circuit 8, therefore, the checked reset vector selection signal S8 first goes high when the reset vector selection signal S2 remains high for at least a period n·T. Even if the reset vector selection signal S2 falsely goes high, therefore, the checked reset vector selection signal S8 maintains a low level if the high-level period is within n·T. Thus, the reset circuit 3 determines that this is not the RAM starting mode but the ROM starting (normal) mode and generates the reset vector V1.

Thus, the microcomputer 15 according to the embodiment 5 can have a fail safe function of not falsely changing the reset vector V1 in a normal state by providing a time restraint for setting the RAM starting mode.

When setting operations of the debugging circuit 2 to output the clock φ of pulses of at least n times at the same time when outputting the reset vector selection signal S2 of a high level (the reset vector selection signal S2 maintains the high level during this period), the checked reset vector selection signal S8 maintains a low level even if the reset vector selection signal S2 falsely goes high since the clock φ does not generate pulses exceeding n times.

Thus, it is possible to provide a fail safe function so that the reset vector V1 in the normal state is not falsely changed by adding an additional signal (clock φ of the pulses of at least n times) output set condition for setting the RAM starting mode.

While the microcomputer 15 according to the embodiment 5 has a structure obtained by adding the fail safe circuit 8 to the structure of the embodiment 1, each of the microcomputers 12 to 14 according to the embodiments 2 to 4 can be provided with a fail safe function such as time setting and additional signal output setting so that the reset vector in the normal state or the interrupt vector is not falsely changed through a similar principle.

While the invention has been shown and described in detail, the foregoing description is in all aspects illustrative and not restrictive. It is therefore understood that numerous modifications and variations can be devised without departing from the scope of the invention.

What is claimed is:

1. A microcomputer including a built-in storage portion capable of registering an evaluation program from an external evaluation unit, comprising:
   a CPU;
   a debugging circuit performing a support operation for registration of said evaluation program from said external evaluation unit in said storage portion and support operation in execution of said evaluation program, wherein said debugging circuit is capable of generating a reset vector selection signal indicating an address for executing said evaluation program under control of said external evaluation unit; and
   a reset circuit generating a reset vector in reset cancellation after execution of a reset operation and making said CPU execute a program to be executed in reset cancellation registered on said storage portion on the basis of said reset vector, said reset circuit deciding said reset vector on the basis of said reset vector selection signal.

2. The microcomputer according to claim 1, wherein said external evaluation unit includes an ICE (in-circuit emulator).

3. The microcomputer according to claim 1, wherein
   said address for executing said evaluation program includes a start address for said evaluation program, and
   said reset circuit generates said reset vector indicating starting from said start address to make said CPU execute said evaluation program as said program to be executed in reset cancellation when said reset vector selection signal indicates said start address for said evaluation program.

4. The microcomputer according to claim 3, wherein said storage portion consists of first and second storage areas having different electric characteristics, said evaluation program is registered in said first storage area, and said reset circuit generates a reset vector indicating starting from an address on said second storage area when said reset vector selection signal does not indicate said start address for said evaluation program.

5. The microcomputer according to claim 3, wherein said first storage area includes a RAM area, and said second storage area includes a ROM area.

6. The microcomputer according to claim 5, wherein said ROM area includes a rewritable flash memory area.

7. The microcomputer according to claim 1, wherein
   said storage portion includes an interrupt register capable of storing an interrupt address, said address for executing said evaluation program includes an address of said interrupt register,
   said debugging circuit is capable of storing a start address for said evaluation program in said interrupt register as said interrupt address under control of said external evaluation unit, and
   said reset circuit generates a reset vector indicating interrupt processing starting from said interrupt address to make said CPU execute said evaluation program as said program to be executed in reset cancellation when said reset vector selection signal indicates an address of said interrupt register.

8. The microcomputer according to claim 1, wherein said reset vector selection signal includes a reset address selection signal capable of specifying all addresses on said storage portion.

9. The microcomputer according to claim 8, wherein
   said reset address selection signal is propagated to said reset circuit through a plurality of signal lines, and said plurality of signal lines are capable of propagating multilevel information allowing recognition of at least three levels, and
   said reset circuit includes a multilevel determination circuit capable of determining multilevel information of each of said plurality of signal lines.

10. The microcomputer according to claim 9, wherein
    at least three types of multilevel voltages are set in each of said plurality of signal lines thereby propagating said reset address selection signal, and
    said multilevel determination circuit includes a voltage conversion circuit converting said voltages of each of said plurality of signal lines and recognizing said multilevel information.

11. The microcomputer according to claim 1, further comprising:
    a fail safe circuit interposed between said debugging circuit and said reset circuit for validating indication of said address for executing said evaluation program by said reset vector selection signal only when said reset vector selection signal satisfies a prescribed condition and indicates a start address for said evaluation program.

12. The microcomputer according to claim 11, wherein said prescribed condition includes such a time restraint that said reset vector selection signal continuously indicates said address for executing said evaluation program at least for a prescribed period.

* * * * *